No. 731,254. PATENTED JUNE 16, 1903.
J. F. WHITMAN.
MANUFACTURE OF ORNAMENTAL ARTICLES FROM PLASTIC MATERIALS.
APPLICATION FILED OCT. 3, 1902.
NO MODEL.
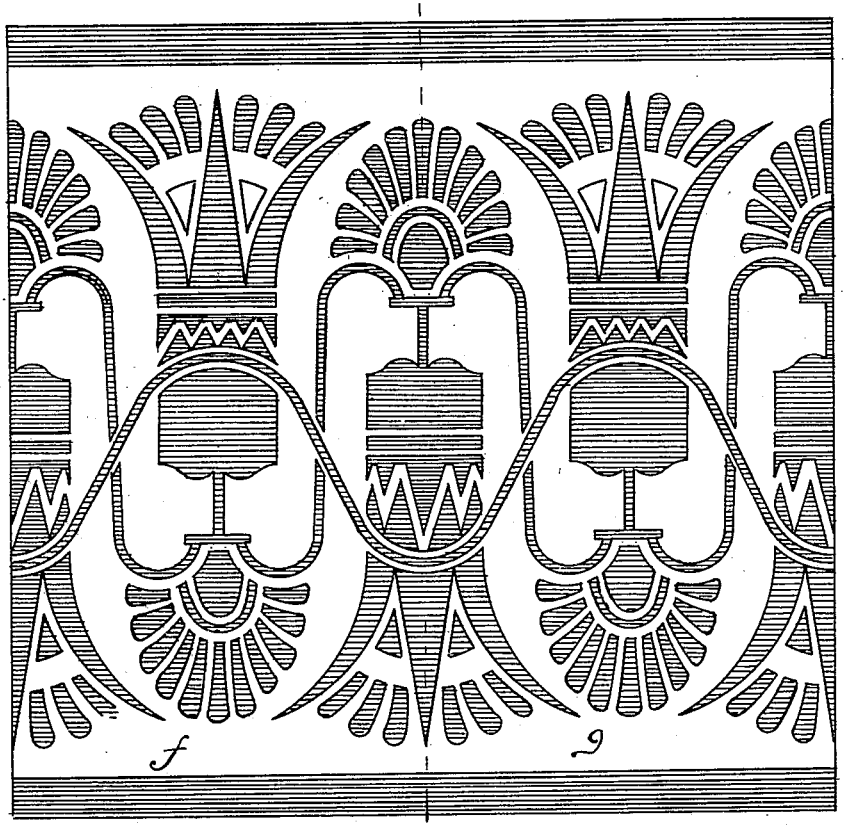
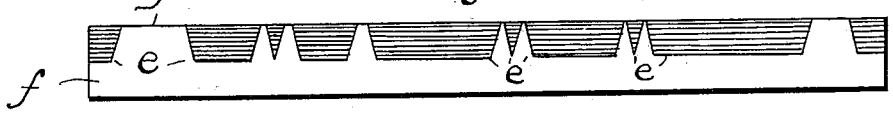
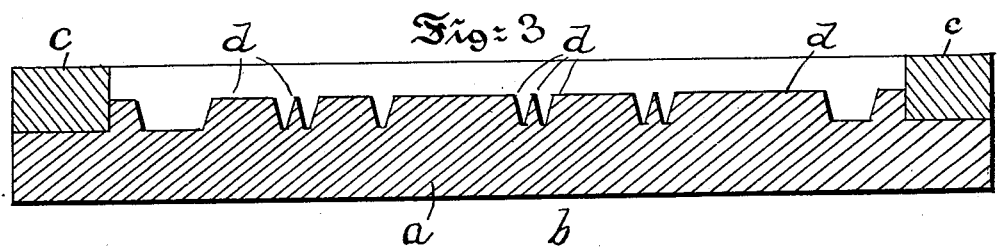
Witnesses:
Craig Shields
Wm R. Webster
Inventor:
John Franklin Whitman
By his Attorney Chas. A. Cutter No. 731,254. Patented June 16, 1903.

UNITED STATES PATENT OFFICE.

JOHN FRANKLIN WHITMAN, OF PHILADELPHIA, PENNSYLVANIA.

MANUFACTURE OF ORNAMENTAL ARTICLES FROM PLASTIC MATERIALS.

SPECIFICATION forming part of Letters Patent No. 731,254, dated June 16, 1903.

Application filed October 3, 1902. Serial No. 125,847. (No specimens.)

*To all whom it may concern:*

Be it known that I, JOHN FRANKLIN WHITMAN, a citizen of the United States, and a resident of the city and county of Philadelphia, State of Pennsylvania, have invented certain new and useful Improvements in the Manufacture of Ornamental Articles from Plastic Materials, of which the following is a specification.

My invention relates to improvements in the manufacture of ornamental articles, as floor-coverings, wainscoatings, &c., from plastic materials.

In carrying out my invention I take any suitable plastic material, as cement, asbestolith, magnesialith, or any of the other well-known plastic materials capable of standing the wear and tear to which the finished article is to be subjected, and I place this material in a mold of the size of the design to be produced, the bottom of the mold carrying in relief the design to be sunken in the face of the cast, and by hydraulic or other suitable pressure I force the plastic material into the mold until every corner of the latter is full. I now have a cast in the face of which appears in intaglio the design carried by the bottom of the mold. The impression may be as deep or as shallow as may be desired or as the use to which the cast is to be put dictates. Having secured an impression of the design in the material in the mold, which material forms the field of the design, I fill up the depressions with a plastic material or materials of any desired color or combination of colors and set the cast away to harden. After hardening the cast is placed face downward on a rubbing-bed and is rubbed or polished until brought to a flat surface.

In the accompanying drawings, Figure 1 shows a face view of a completed cast; Fig. 2, a section of Fig. 1 on line 2 2; and Fig. 3 a section of the mold upon line 2 2, Fig. 1, in which the main or field portion of the cast is formed.

$a$ is the mold, upon the bottom of which is formed in relief the desired design. For convenience this mold is preferably formed in two parts, $b$ being the bottom part and $c$ a detachable side or rim, which can be removed for convenience in drawing the cast from the mold.

$d\ d\ d$ represent the relief design carried by the mold, which forms the depressions $e$ in the cast $f$, which depressions are filled with a plastic material or materials of a color or colors contrasting with that of the field $g$ of the cast.

Having thus described my invention, I claim as new and desire to secure by Letters Patent—

The described improvement in the manufacture of ornamental articles from plastic materials, which consists first, in forcing a mass of plastic material by pressure into a mold and simultaneously forming in the face of the mass a design in intaglio; second, in removing the molded mass from the mold and in filling the depressions formed in its face with a plastic material of a contrasting color; third, in rubbing down the face of the article after it has hardened until the design and the field are upon the same level.

JOHN FRANKLIN WHITMAN.

Witnesses:
F. L. MOISTER,
A. STANLEY PETERSON.